US008081686B2

(12) United States Patent
Bi et al.

(10) Patent No.: US 8,081,686 B2
(45) Date of Patent: Dec. 20, 2011

(54) SCALABLE SPECTRUM CDMA COMMUNICATION SYSTEMS AND METHODS WITH DYNAMIC ORTHOGONAL CODE ALLOCATION

(75) Inventors: Qi Bi, Morris Plains, NJ (US); Yang Yang, Parsippany, NJ (US); Qinqing Zhang, Morganville, NJ (US)

(73) Assignee: Alcatel Lucent, Paris (FR)

( * ) Notice: Subject to any disclaimer, the term of this patent is extended or adjusted under 35 U.S.C. 154(b) by 1251 days.

(21) Appl. No.: 11/434,149

(22) Filed: May 16, 2006

(65) Prior Publication Data

US 2007/0268959 A1  Nov. 22, 2007

(51) Int. Cl.
*H04L 27/28* (2006.01)
*H04B 1/00* (2006.01)
*H04B 7/216* (2006.01)
*H04J 11/00* (2006.01)
*H04J 3/04* (2006.01)

(52) U.S. Cl. ........ 375/260; 375/130; 375/140; 375/146; 370/208; 370/210; 370/335; 370/342; 370/441; 370/536

(58) Field of Classification Search .................. 375/130, 375/140, 146, 260; 370/208, 320, 335, 441, 370/536, 342; 455/226.1, 452.2
See application file for complete search history.

(56) References Cited

U.S. PATENT DOCUMENTS

| | | | |
|---|---|---|---|
| 6,215,777 B1 | 4/2001 | Chen et al. | |
| 6,526,065 B1 * | 2/2003 | Cheng | ........................... 370/441 |
| 6,693,952 B1 | 2/2004 | Chuah et al. | |
| 6,781,980 B1 | 8/2004 | Dajer et al. | |
| 6,810,030 B1 | 10/2004 | Kuo | |
| 6,930,981 B2 | 8/2005 | Gopalakrishnan et al. | |
| 7,012,886 B2 | 3/2006 | Meier et al. | |
| 2002/0172181 A1 | 11/2002 | Sayeed | |
| 2003/0026200 A1 * | 2/2003 | Fu et al. | ......................... 370/208 |
| 2003/0081656 A1 | 5/2003 | Buehrer et al. | |
| 2003/0086364 A1 * | 5/2003 | Horne | ........................... 370/208 |
| 2003/0108089 A1 | 6/2003 | Lee et al. | |
| 2004/0081113 A1 * | 4/2004 | Earnshaw et al. | ............. 370/320 |
| 2004/0190600 A1 | 9/2004 | Odenwalder | |
| 2004/0229628 A1 * | 11/2004 | Khan | ......................... 455/452.2 |
| 2005/0111425 A1 * | 5/2005 | Mottier et al. | ................. 370/342 |

(Continued)

FOREIGN PATENT DOCUMENTS

JP  2005-124157  5/2005

OTHER PUBLICATIONS

"Dynamic assignment of orthogonal variable-spreading-factor codes in W-CDMA," IEEE Journal on Selected Areas in Communications, vol. 18, Issue 8, Aug. 2000 pp. 1429-1440.*

(Continued)

*Primary Examiner* — Khanh C Tran
*Assistant Examiner* — Eboni Hughes
(74) *Attorney, Agent, or Firm* — Harness, Dickey & Pierce (57) ABSTRACT

At least a portion of a total spectrum bandwidth of a wireless system may be allocated to each of a plurality of users by assigning at least one unique spreading code to each of the plurality of users. At least two of the plurality of users may have different spectrum capabilities and may transmit simultaneously. Each of the assigned spreading codes may have a different code length. The number and/or the code length of the spreading codes assigned to each user may be indicative of a portion of the total spectrum bandwidth allocated to each user.

19 Claims, 4 Drawing Sheets

U.S. PATENT DOCUMENTS

2005/0157686 A1* 7/2005 Yang .............................. 370/335
2005/0164663 A1* 7/2005 Santhoff et al. ............ 455/226.1
2005/0249177 A1  11/2005 Huo et al.

OTHER PUBLICATIONS

Qualcomm Incorporated; "The cdma2000 High Rate Packet Data System," 80-H0593-1, Revision A, Mar. 26, 2002.

WCDMA; Chapter 6 (pp. 171-205); http://www.privateline.com/3G/WCDMA.pdf.

3 GPP TS 25.201 V5.0.0 (Dec. 2001), "$3^{rd}$ Generation Partnership Project; Technical Specification Group Radio Access Network; Physical layer- General description," (Release 5).

Milstein, Laurence B., "Wideband Code Division Multiple Access," IEEE Journal on Selected Areas in Communications, vol. 18, No. 8, pp. 1344-1354, Aug. 2000.

3 GPP TS 25.223 V5.3.0 (Mar. 2003), "$3^{rd}$ Generation Partnership Project; Technical Specification Group Radio Access Network; Spreading and Modulation (TDD)," (Release 5).

"Basic Structure of Control Channel and Synchronization Channel for Scalable Bandwidth in Evolved UTRA Downlink" $3^{rd}$ Generation Partnership Project (3GPP); Technical Report (TR), vol. TR 25.913 V7.0.0, Oct. 14, 2005, pp. 1-15, XP003009126.

Shueh F. et al.; "Code Assignment for IMT-2000 on Forward Radio Link" VTC 2001 Spring. IEEE VTS $53^{rd}$ Vehicular Technology Conference, Rhodes,Greece, May 6-9, 2001, IEEE Vehicular Technology Conference, New York, NY; IEEE, US, vol. 2 of 4. Conf. 53, May 6, 2001, pp. 906-910, XP001067092.

International Search Report and Written Opinion (dated Oct. 30, 2007) for counterpart International Application No. PCT/US2007/010946 are provided for the purposes of certification under 37 C.F.R. §§ 1.97(e) and 1.704(d).

Chinese Office Action dated Mar. 24, 2011, issued for Application No. 200780017583.7 and English Translation thereof.

Japanese Office Action dated May 25, 2011, issued for Application No. 2009-510970 and English Translation thereof.

Antipolis, Sophia, "Physical Channel Concept for Scalable Bandwidth in Evolved UTRA Downlink," 3GPP TSG RAN WG1 Ad Hoc on LTE, Jun. 20-21, 2005.

* cited by examiner

SCALABLE SPECTRUM CDMA COMMUNICATION SYSTEMS AND METHODS WITH DYNAMIC ORTHOGONAL CODE ALLOCATION

BACKGROUND OF THE INVENTION

1. Field of the Invention

Example embodiments of the present invention relate to wireless communications systems. For example, at least some example embodiments of the present invention relate to methods and apparatuses for providing a scalable spectrum, spectrum bandwidth and/or throughput to users in a wireless communication system.

2. Description of the Conventional Art

Code division multiple access (CDMA) techniques (e.g., IS-95, cdma2000, Wideband CDMA (WCDMA), etc.) employ code channels for transmitting information to multiple users simultaneously. Each code channel is distinguished by a unique spreading code (e.g., Gold codes, Walsh codes, OVSF codes, etc.). WCDMA is a $3^{rd}$ Generation wireless technology that utilizes a higher spectrum bandwidth than, for example, IS-95 CDMA. With the increased spectrum bandwidth, WCDMA provides higher data rates or throughput to wireless users. Universal Mobile Telecommunications Systems (UMTS) may utilize WCDMA as a suitable transport mechanism.

Figure 1:
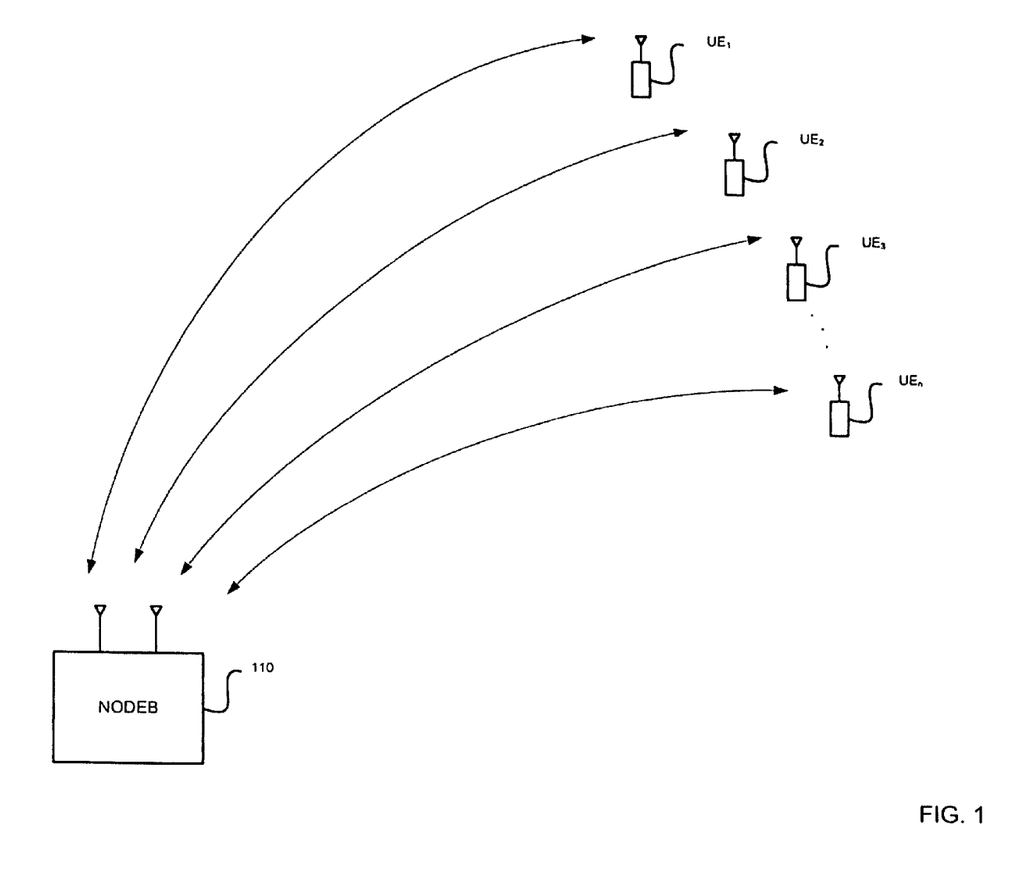
FIG. 1 illustrates a portion of a conventional CDMA wireless system.

FIG. 1 illustrates a portion of a CDMA wireless system referred to as a CDMA cell site or cell. As shown, the CDMA cell site includes a base transceiver station (BTS) 110 and a radio interface part. The BTS 110 may communicate with a radio network controller (RNC) (not shown) as is well-known in the art. The combination of one or more BTSs and an RNC is referred to as a radio access network (RAN).

The BTS 110 may include multiple radio transceivers for communicating with the RNC and a plurality of users $UE_1$, $UE_2, UE_3, \ldots UE_n$ via the radio interface part. As used herein, the term "user," may be synonymous with mobile station, mobile user, user equipment (UE), subscriber, wireless terminal and/or remote station and may describe a remote user of wireless resources in a wireless communication network. For example, user equipment may be a mobile phone, wireless equipped computer, wireless equipped personal digital assistant (PDA), etc.

Referring still to FIG. 1, BTS 110 and the plurality of users $UE_1, UE_2, UE_3, \ldots, UE_n$ may communicate in the forward link (e.g., from BTS to user) or the reverse link (e.g., from user to BTS) simultaneously via code channels. The code channels in the forward link, for example, may be differentiated from each other by a unique spreading code (e.g., a Gold code, Walsh code, OVSF code, etc.). A unique spreading code may be assigned to each user by the BTS 110. The code channels in the reverse link may also be differentiated in a similar manner.

Combining data signals with a unique spreading code spreads each individual data signal over a much wider spectrum (e.g., 5 MHz for WCDMA) than the spectrum (e.g., 15 kHz for speech data signal) occupied by the data signals prior to spreading. After spreading, the BTS 110 combines all spread data signals, and transmits the resultant signal to each user served by the BTS 110. Each user is informed of its assigned spreading code via a separate signaling channel as is well-known in the art. Spreading the data signal over a wider spectrum allows for reduced transmission power while still obtaining a suitable data rate and/or throughput.

In one example, upon receiving the resultant signal transmitted from the BTS 110, user $UE_1$ identifies the data signal intended for user $UE_1$ using the same unique spreading code used to spread the data signal at the BTS 110. Other data signals spread using other spreading codes are seen by user $UE_1$ as noise. The length of a spreading code assigned to each user is dependent upon the information data rate assigned to the user and/or the spectrum capability of each user. For example, the wider the spectrum capability of the user, the longer the assigned spreading code will be for the same information data rate. This is a result of the larger spectrum over which the data signal may be spread.

Referring still to the above example, at user $UE_1$ the despread data signal is sent to a filter that allows the energy associated with the received data signal to pass, while reducing the interference. The signal-to-noise ratio (SNR) is determined by the ratio of the data signal power to the sum of all of the other signal powers. The SNR is enhanced by the processing gain, that is, the ratio of the spectrum over which the data signal has been spread to the baseband data rate.

To provide higher throughput and/or information data rates required by wireless applications, for example, on the forward link, the BTS 110 and users $UE_1, UE_2, \ldots, UE_n$ may operate in a larger spectrum (e.g., 10 MHz or 20 MHz). Conventionally, these higher spectrum bandwidth requirements are satisfied by allowing users to access multiple carriers (e.g., multiple 5 MHz carriers in WCDMA) simultaneously while maintaining each individual carrier structure. This is referred to an Nx system. An Nx system allows backward compatibility with existing systems. However, utilizing an Nx system may increase the cost of radio-frequency (RF) design for users due to added RF path components and/or may introduce cross-carrier interference due to imperfect filter response in single carrier frequency designs.

SUMMARY OF THE INVENTION

Example embodiments of the present invention provide methods, apparatuses and a wireless communication system with a scalable bandwidth, employing dynamic spreading code (e.g., unique orthogonal code) assignment for users with different spectrum capability (e.g., dynamic CDMA). Example embodiments of the present invention are backward compatible with the narrower spectrum systems, eliminate cross-carrier interference and/or provide improved or optimal performance.

At least one example embodiment of the present invention provides a method for allocating at least a portion of a total spectrum bandwidth for a multi-carrier wireless system to a plurality of users transmitting simultaneously. At least a portion of the total spectrum bandwidth may be allocated to each of a plurality of users by assigning at least one unique spreading code to each of the plurality of users. At least two of a plurality of users may have different spectrum capabilities and/or each of the assigned spreading codes may have the same code length. The number of spreading codes assigned to each user may be indicative of a portion of the total spectrum bandwidth allocated to each user.

At least one other example embodiment of the present invention provides a method for allocating at least a portion of a total spectrum bandwidth for a multi-carrier wireless system to a plurality of users transmitting simultaneously. At least a portion of the total spectrum bandwidth may be allocated to each of a plurality of users by assigning at least one unique spreading code to each of the plurality of users. In this example embodiment, at least two of the plurality of users may have different spectrum capabilities, and at least two of the assigned spreading codes may have different code lengths. The length of a spreading code assigned to a user may be indicative of the total spectrum bandwidth allocated to the user.

In at least some example embodiments of the present invention, each of the plurality of users may be associated with a spectrum bandwidth class based on a spectrum capability associated with each user. The code length may be based on the spectrum bandwidth class of the user having a highest spectrum capability. The spectrum bandwidth class associated with each user may be indicative of a spectrum over which each user receives transmitted signals.

In at least some example embodiments of the present invention, the number of spreading codes assigned to each user may depend on at least a target throughput associated with each user. The portion of the total spectrum bandwidth assigned to each user may increase as the number of spreading codes assigned to each user increases. At least two of the plurality of users may be assigned a different number of spreading codes based on a target throughput associated with each of the plurality of users.

In at least some example embodiments of the present invention, the method may further include determining a number of spreading codes to assign to each of the plurality of users based on at least a target throughput associated with each user, and allocating a portion of the total spectrum bandwidth by assigning spreading codes based on the determining step. The assigned spreading codes may be selected from a code tree or Hadamard matrix based on the determining step.

In at least some example embodiments of the present invention, the method may further include comparing target throughputs associated with each user, and assigning at least two spreading codes to at least a user having a largest associated target throughput. A code pattern of each code assigned to each of the plurality of users may depend on the spectrum bandwidth capability of each user.

In at least some example embodiments of the present invention, each of the plurality of users may be associated with a spectrum bandwidth class, and the spectrum bandwidth class may be based on a spectrum capability associated with each user. The length of each spreading code may be based on the spectrum bandwidth class of the user to which the spreading code is assigned. The spectrum bandwidth class associated with each user may be indicative of a spectrum over which each user receives transmitted signals. The length of the spreading code assigned to each of the plurality of users may be inversely proportional to the portion of the total spectrum bandwidth assigned to each of the plurality of users.

In at least some example embodiments of the present invention, at least two of the plurality of users may be assigned spreading codes having different code lengths based on at least a target throughput associated with each of the plurality of users.

In at least some example embodiments of the present invention, the method may further include determining at least one of a length of a spreading code and a number of spreading codes to assign to each of the plurality of users based on a target throughput associated with each user. The total spectrum bandwidth may be allocated by assigning spreading codes based on the determining step.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Although the following description relates to a communication network or system based on CDMA technologies such as WCDMA/UMTS, and will be described in this example context with respect to FIG. 1, it should be noted that the example embodiments shown and described herein are meant to be illustrative only and not limiting in any way. For example, methods and/or apparatuses according to example embodiments of the present invention may be utilized in conjunction with any wireless technology, such as, IS95, cdma2000, various technology variations and/or related technologies. Various modifications will be apparent to those skilled in the art for application to communication systems or networks based on technologies other than the above, which may be in various stages of development and intended for future replacement of, or use with, the above networks or systems.

Example embodiments of the present invention will be described herein with respect to transmissions in the forward link (e.g., from BTS to user); however, it will be understood that example embodiments of the present invention may be equally applicable to transmissions in the reverse link (e.g., from user to BTS).

As described above, the term user may be synonymous with mobile station, mobile user, user equipment (UE), subscriber, wireless terminal and/or remote station and may describe a remote user of wireless resources in a wireless communication network.

Example embodiments of the present invention relate to methods and apparatuses for providing scalable spectrum, spectrum bandwidth and/or throughput to a plurality of users dynamically. At least one example embodiment of the present invention provides a method and apparatus for assigning one or more spreading codes to users according to the spectrum bandwidth class of the BTS, the spectrum bandwidth class of the user, spectrum requirements of the user, a target throughput and/or a target information data rate associated with each user. Spectrum bandwidth class refers to the spectrum capability of transceivers at, for example, BTS 110 or users $UE_1$, $UE_2$, ..., $UE_n$. Spectrum capability refers to the maximum spectrum bandwidth over which a BTS and/or a user may receive a transmitted signal, for example, in the forward link. That is, for example, the maximum spectrum over which the data signal may be spread. Spectrum requirements, target throughput and/or data rate may be dependent on, for example, the data rate requested by respective users, type of traffic being transmitted to each user (e.g., voice, data, video, etc.), etc.

As will be discussed, for the same information data rate, users with larger spectrum capabilities may be assigned longer codes as compared to users with smaller spectrum capabilities. According to example embodiments of the present invention, the assigned spreading codes, even for different users with different spreading capabilities, may have the same lengths. Alternatively, the lengths may be different. That is, for example, BTSs may transmit data signals spanning different spectrum bandwidths based on assigned spreading codes. The spectrum of the wireless system may become scalable based on the spreading code assigned to each user scheduled to receive a transmission in the forward link.

Example embodiments of the present invention may be implemented in any communication system having a system spectrum B satisfying the equation $B=2^N B_0$, where $B_0$ is the "single-carrier" bandwidth and $2^N$ is the number of carriers supported by the communication system. For example, in a WCDMA system, the single carrier bandwidth $B_0$ may be 5 MHz, and the system may support 8 carriers. Therefore, the WCDMA system may have a total system spectrum bandwidth of $8B_0$ or 40 MHz because $B_0=5$ MHz and $N=3$. As discussed herein, "system spectrum bandwidth," refers to the RF transceiver capability of the wireless system, or in other words, the spectrum over which the BTS and user transceivers may be capable of spreading data signals to be transmitted (e.g., in the forward link).

As discussed above, FIG. 1 illustrates a cell site of a CDMA wireless system. Example embodiments of the present invention will be described with regard to the cell site shown in FIG. 1 and with regard to a CDMA system; however, example embodiments of the present invention, may be equally applicable to any wireless communication system (e.g., CDMA, cdma2000, IS-95, etc.).

Referring to FIG. 1, BTS 110 may serve a plurality of users $UE_1$, $UE_2$, $UE_3$, . . . , $UE_n$, and each of BTS 110 and users $UE_1$, $UE_2$, $UE_3$, . . . , and $UE_n$ may be grouped into spectrum bandwidth classes based on the number of carriers supported by each. That is, for example, BTS 110 may support $2^N$ carriers, and thus, may belong to a spectrum bandwidth class N. Similarly, user $UE_1$ may support $2^j$ carriers, and thus, may belong to a spectrum bandwidth class j. In other words, spectrum bandwidth classes, as discussed herein, may be identified by the number of supported carriers (e.g., N for BTS 110 or j for user $UE_1$), and each BTS and/or user $UE_1$, $UE_2$, . . . $UE_n$ may belong to a different spectrum bandwidth class.

In one example, older legacy users may be capable of transmitting and/or receiving narrowband signals (e.g., data signals spread over a spectrum $2^j B_0$, where j=0). These narrowband users may be associated with a spectrum bandwidth class j=0 because each user may support only a single carrier. Newer, enhanced users may be capable of transmitting and/or receiving both narrowband and wideband signals (e.g., data signals spread over a spectrum $2^j B_0$, where j=1, 2 or 3, etc.). For example, these newer users may be associated with a spectrum bandwidth class j=3 because each user in this spectrum bandwidth class may support 8 carriers. The BTS 110 may also be associated with a spectrum bandwidth class N=3 because the BTS 110 may support a maximum of 8 carriers.

Figure 2:
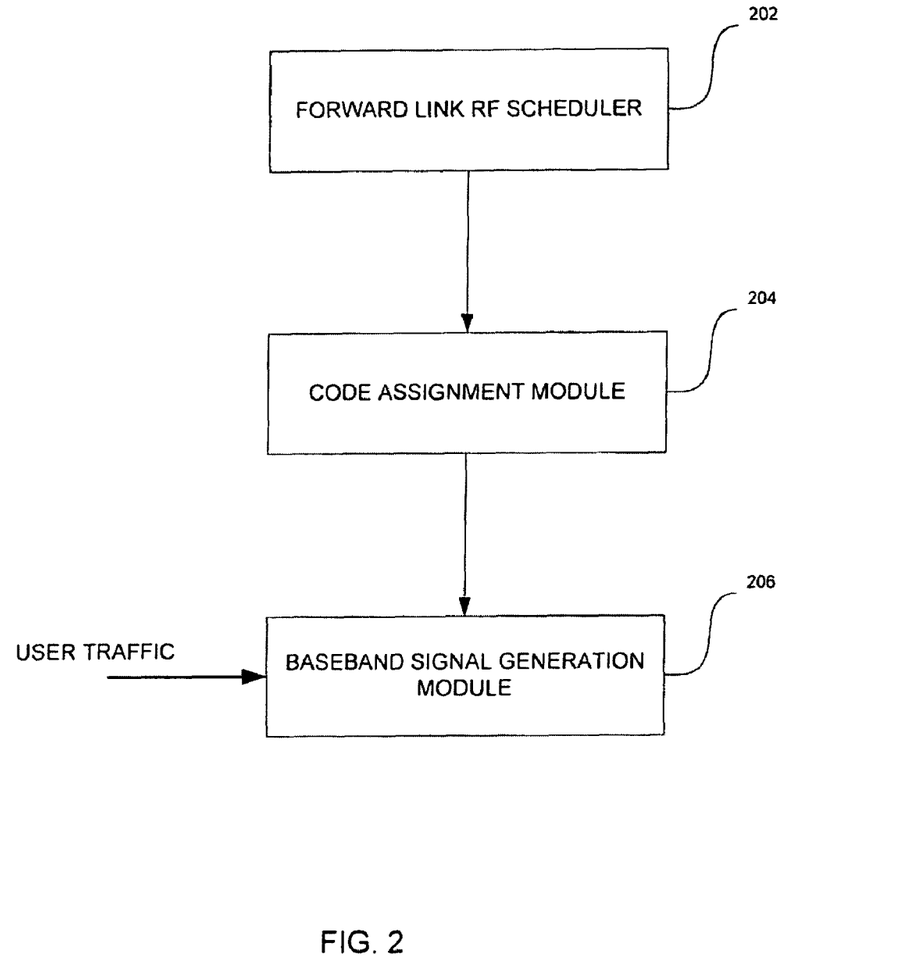
FIG. 2 illustrates an apparatus according to an example embodiment of the present invention.

FIG. 2 is a block diagram illustrating an example embodiment of the present invention. The example embodiment shown in FIG. 2 may be implemented using a processor such as a digital signal processor (DSP) or application specific integrated circuit (ASIC). Alternatively, the example embodiment of FIG. 2 may be implemented at least in part in the form of a computer software program stored in a memory or external storage device. Such a program may be executed, for example, by a processor. The processor used to implement and/or execute the example embodiment shown in FIG. 2 may be one of a plurality of processors included at a conventional BTS such as BTS 110. The apparatus of FIG. 2 may be included along with well-known circuitry at BTSs such as the BTS 110. As shown, the apparatus of FIG. 2 may include a scheduler 202, a code assignment module (CAM) 204 and a baseband signal generation module 206. An example embodiment of the present invention will be described with regard to the CDMA cell site of FIG. 1.

The scheduler 202 may schedule a plurality of users for simultaneous transmission (e.g., from BTS to user) at a given time. The maximum number of users that may be scheduled for simultaneous transmission may be dependent on the spectrum bandwidth class of the BTS 110. For example, if the BTS 110 belongs to a spectrum bandwidth class N=3 (e.g., the BTS 110 supports 8 carriers), the scheduler 202 may schedule a maximum of $2^3$ or 8 users for simultaneous transmission at any given time. The BTS 110 may schedule users for transmission according to any well-known or specially designed scheduling algorithm. For example, the scheduler 202 may schedule users based on link quality, priority of traffic intended for each user, quality of service (QOS) requirements, user priority level, etc.

Within the maximum of $2^N$ users scheduled for simultaneous transmission, the scheduler 202 may schedule a maximum of J users associated with a respective spectrum bandwidth class, where $J=2^j$. For example, if the scheduler 202 schedules 8 users for transmission, only maximum of 2 users may belong to spectrum bandwidth class j=1 because $J=2^1=2$. Similarly, only a maximum of 4 users belonging to spectrum bandwidth class j=2 may be scheduled because $J=2^2=4$, and only a maximum of 8 users belonging to spectrum bandwidth class j=3 may be scheduled because $J=2^3=8$. The total number of scheduled users, however, may not be greater than $2^N$.

After scheduling users for simultaneous transmission at a given time, the scheduler 202 may identify the scheduled users, spectrum bandwidth class of each scheduled user, spectrum requirements and/or target throughput associated with each scheduled user to the CAM 204. The operations, processes and/or methods performed by the CAM 204 will be discussed in more detail below.

The CAM 204 may assign one or more spreading codes to each scheduled user based on, for example, the spectrum bandwidth class of each scheduled user, spectrum requirements and/or target throughput associated with each scheduled user. As stated above, the BTS 110 and users $UE_1$, $UE_2$, $UE_3$, . . . , $UE_n$ may transmit data signals over wireless code channels differentiated by unique spreading codes. In example embodiments of the present invention, the unique spreading codes assigned to each scheduled user may result in the scaling of the wireless channel over which each user may receive transmitted data signals.

Each of the assigned spreading codes may be a unique orthogonal binary code (e.g., a Gold code, a Walsh code, an OVSF code, etc.). Example embodiments of the present invention will be discussed with regard to Walsh codes; however, any suitable spreading code may be utilized in conjunction with example embodiments of the present invention.

In one example, the CAM 204 may assign spreading codes all of which are $2^N$ chips long. In another example, the CAM 204 may assign spreading codes which vary in length from $2^0$ chips to $2^N$ chips, inclusive. The CAM 204 may assign spreading codes selected from, for example, a Walsh-Hadamard matrix or code tree.

Figure 3:
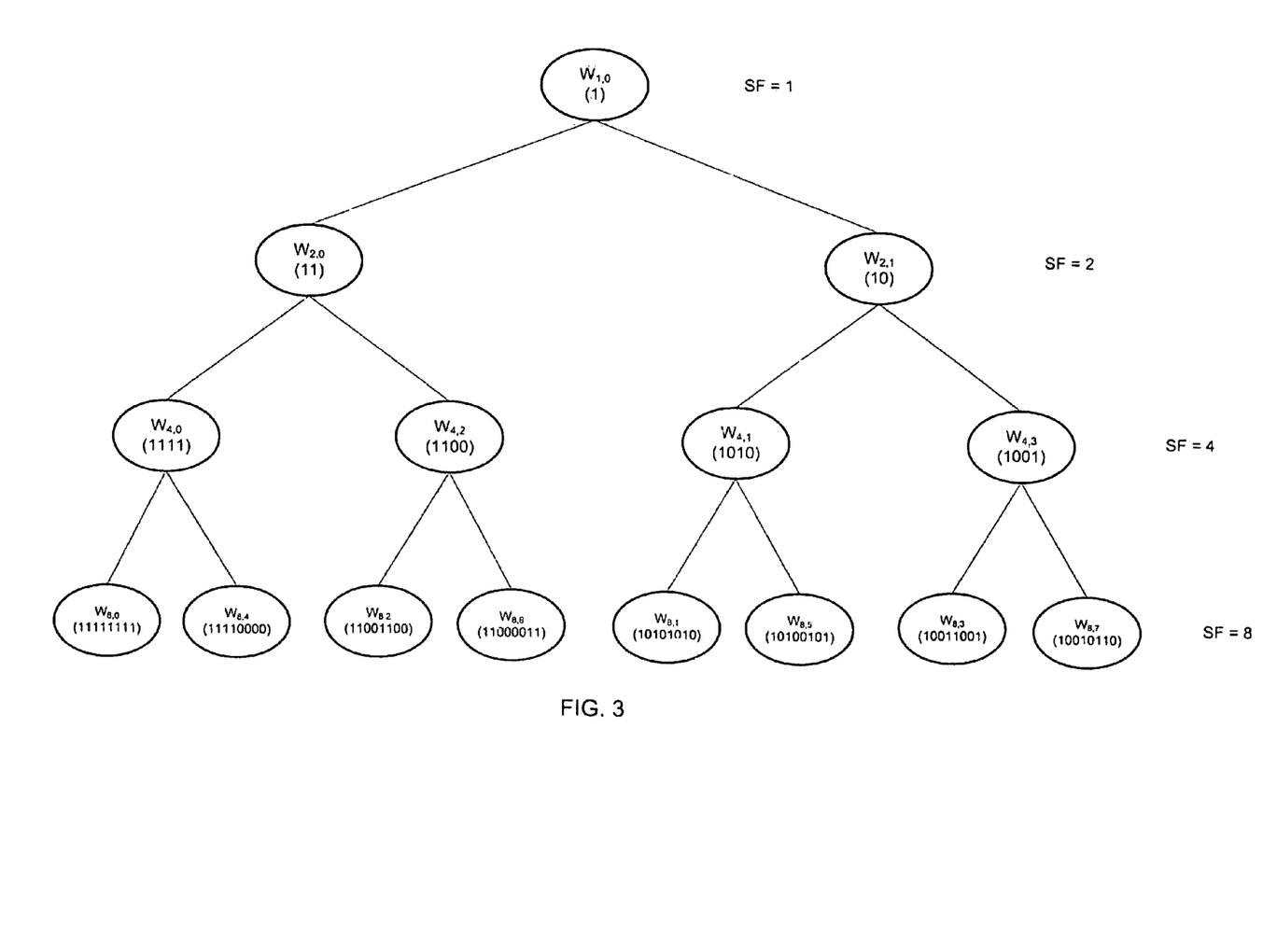
FIG. 3 illustrates a simple example code tree.

FIG. 3 illustrates a simple, example code tree. As shown, the Walsh codes are uniquely described as $W_{SF,m}$, where SF is the spreading factor of the code and m is the code number $0 \leq m \leq SF-1$. Namely, each code tree defines Walsh codes of length SF, corresponding to a spreading factor of SF as shown in FIG. 3, and each Walsh code of spreading factor SF may have a unique code pattern identified by the code number m.

Referring back to FIGS. 1 and 2, the CAM 204 may select the codes from the code tree based on, for example, spectrum bandwidth class of each scheduled user, spectrum requirements and/or target throughput associated with each scheduled user. Methods for assigning spreading codes to users, according to example embodiments of the present invention, will be discussed in more detail below by way of example. However, it will be understood that the example embodiments of the present invention may be implemented on much larger scales (e.g., using larger and/or more complex code trees), and in any suitable wireless communication system. The following examples will be discussed with regard to FIG. 1, assuming that the scheduler 202 at BTS 110 has scheduled users $UE_1$, $UE_2$ and $UE_3$ for simultaneous transmission at a given time.

In one example embodiment, the CAM 204 may assign spreading codes each of which have a same length of $2^N$ chips. In this example, each user may be assigned a spreading code having the same length regardless of which spectrum bandwidth class each user belongs. In this example, however, the code pattern assigned to each user may depend on the spectrum bandwidth class to which each user belongs.

As discussed above, N refers to the number of carriers supported by the wireless system (e.g., in a wireless system in which $B=2^N B_0$, $2^N=8$, N=3 and thus, the wireless system effectively has 3 single carriers of bandwidth $B_0$) The CAM 204 may assign one or more spreading codes to each scheduled user such that, for each scheduled user, the assigned spreading code bears the signature:

$$C = \underbrace{c_0 c_0 \ldots c_0}_{2^{N-j}} \underbrace{c_1 c_1 \ldots c_1}_{2^{N-j}} \ldots \underbrace{c_k c_k \ldots c_k}_{2^{N-j}}$$

where $c_0 c_1 \ldots c_k$ is a spreading code of length $k=2^j$.

The CAM 204 may assign at least one or more spreading codes to each scheduled user to increase throughput and/or information data rate based on the target throughput associated with each scheduled user. That is, for example, the CAM 204 may assign multiple spreading codes to one or more scheduled users if the CAM 204 determines that increased throughput and/or information data rate is necessary. The CAM 204 may determine that increased throughput and/or information data rate is necessary based on the target throughput associated with each scheduled user. For example, if the target throughput is higher for user $UE_1$ compared to user $UE_2$, the CAM 204 may assign the user $UE_1$ multiple spreading codes, while assigning user $UE_2$ a single spreading code, or a lesser number of spreading codes as compared to those assigned to user $UE_1$.

The following examples of the manner in which codes may be assigned by the CAM 204 to scheduled users $UE_1$, $UE_2$ and $UE_3$ win be discussed with regard to the above code signature C, the cell-site of FIG. 1 and the example code tree of FIG. 3.

For example, if $B=8B_0$ (i.e., $2^N=8$ and N=3) for the cell-site of FIG. 1, and user $UE_1$ supports a spectrum bandwidth of $2B_0$ (i.e., $2^j=2$ and j=1), the CAM 204 may select a maximum of two spreading codes from a total of four available spreading codes having the signature $C=c_0 c_0 c_0 c_0 c_1 c_1 c_1 c_1$ to be assigned to $UE_1$. In this example, only spreading codes having the signature $C=c_0 c_0 c_0 c_0 c_1 c_1 c_1 c_1$ are available for assigning to $UE_1$ because j=1, N=3 and $2^{N-j}=4$. Referring back to the simple code tree of FIG. 3, the four available spreading codes may be '11111111', '11110000', or the corresponding complementary codes thereof '00000000' and '00001111'.

Similarly, if user $UE_2$ supports a spectrum bandwidth of $4B_0$ (i.e., $2^j=4$ and j=2), the CAM 204 may select a maximum of four spreading codes from a total of eight available spreading codes having the signature $C=c_0 c_0 c_1 c_1 c_2 c_2 c_3 c_3$ to be assigned to user $UE_2$. In this example, only spreading codes having the signature $C=c_0 c_0 c_1 c_1 c_2 c_2 c_3 c_3$ are available for assigning to $UE_2$ because j=2, N=3 and $2^{N-j}=2$. Referring again to the code tree of FIG. 3, the eight available spreading codes may include '11111111', '11110000', '11001100', '11000011', or the corresponding complementary codes thereof '00000000', '00001111', '00110011' and '00111100'.

In another similar example, if user $UE_3$ supports a spectrum bandwidth of $8B_0$ (i.e., $2^j=8$ and j=3), the CAM 204 may select a maximum of eight spreading codes from a total of sixteen available spreading codes having the signature $C=c_0 c_1 c_2 c_3 c_4 c_5 c_6 c_7$ to assign to user $UE_3$. In this example, only spreading codes having the signature $C=c_0 c_1 c_2 c_3 c_4 c_5 c_6 c_7$ are available for assigning to $UE_3$ because j=3, N=3 and $2^{N-j}=1$. Referring again to the simple code tree of FIG. 3, the available spreading codes for $UE_3$ may include '11111111', '11110000', '11001100', '11000011', '10101010', '10100101', '10011001', '10010110', or the corresponding complementary codes thereof, '00000000', '00001111', '00110011', '00111100', '01010101', '01011010', '01100110', '01101001'.

In the above examples, the same spreading code may not be assigned to more than one of users $UE_1$, $UE_2$ and $UE_3$, and each scheduled user may be assigned one or more spreading codes having an appropriate code signature. Table 1 illustrates an example code assignment by the CAM 204, the code signaled to the users (via a separate signaling channel as is well-known in the art) and the resultant spectrum bandwidth over which data signals are spread by the BTS 110.

TABLE 1

| Scheduled User | Assigned Code | Code Signaled to User | Resultant Spectrum |
|---|---|---|---|
| user $UE_1$ of $2B_0$: | 11110000 | 10 | $B_0$ |
| user $UE_2$ of $4B_0$: | 11001100 | 1010 | $2B_0$ |
|  | 11000011 | 1001 |  |
| user $UE_3$ of $8B_0$: | 10101010 | 10101010 | $4B_0$ |
|  | 10100101 | 10100101 |  |
|  | 10011001 | 10011001 |  |
|  | 10010110 | 10010110 |  |

As shown from the above example, the greater number of codes assigned to each scheduled user, the larger the spectrum over which the user receives transmitted signals. As is well-known in the art, the greater the spectrum, the higher the resultant information data rate and/or throughput. Thus, according to example embodiments of the present invention, the greater the number of spreading codes assigned to each scheduled user, the higher throughput and/or information data rate for the user.

In the above example, each assigned spreading code results in a bandwidth $B_0$ being allocated to the scheduled user. In this example, the aggregate bandwidth allocated to each scheduled user is equal to the number of assigned codes multiplied by the single carrier bandwidth $B_0$. As shown above, for example, user $UE_3$ may be assigned four spreading codes, and thus, user $UE_3$ may be allocated a spectrum bandwidth of $4B_0$. This may result in a higher throughput and/or information data rate than, for example, user $UE_1$ and user $UE_2$ who have been assigned one spreading code and two spreading codes, respectively.

As discussed above, the CAM 204 may assign spreading codes to users scheduled for simultaneous transmission at any given time based on the spectrum bandwidth class of each user, spectrum requirements and/or a target throughput associated with each scheduled user. Referring to the above example, the example code assignment shown in Table 1 may be used in the event that the scheduled user $UE_3$ requires a higher data rate or throughput as compared to the scheduled users $UE_1$ and $UE_2$.

In another example, the CAM 204 may assign spreading codes varying in length from $2^0$ chips to $2^N$ chips, inclusive based on the spectrum bandwidth class of each user, spectrum requirements and/or target throughput associated with each user. As in the previous example, the following example will be discussed with regard to the code signature C, the cell-site of FIG. 1 and the code tree of FIG. 3. In addition, this example will be described with regard to the same users $UE_1$, $UE_2$ and $UE_3$ scheduled for simultaneous transmission at a given time.

In this example, spreading codes may be assigned by the CAM 204 to users $UE_1$, $UE_2$ and $UE_3$ in the same manner as described above, except that the assigned spreading codes may differ in length. The length of assigned spreading code may imply (or carry) a different spectrum, throughput and/or information data rate to be assigned to each user. That is, for example, the spreading codes may still be assigned such that the assigned spreading code bears the signature:

$$C = \underbrace{c_0 c_0 \ldots c_0}_{2^{N-j}} \underbrace{c_1 c_1 \ldots c_1}_{2^{N-j}} \ldots \underbrace{c_k c_k \ldots c_k}_{2^{N-j}}$$

where $c_0 c_1 \ldots c_k$ is a spreading code of length $k=2^m$, and $m=0, 1, \ldots, j$; however, the spreading codes may be less than $2^N$ chips long.

In this example embodiment, the shorter the assigned code, the greater the assigned spectrum, throughput and/or information data rate. The correlation between the assigned spectrum and the spreading code assigned to each user may be expressed by Equation 1 shown below.

$$AssignedSpectrum = \frac{2^N}{k_{UEi}} B_0 \qquad \text{Equation 1}$$

In Equation 1, N is the spectrum bandwidth class of the BTS or wireless system, and $k_{UEi}$ is the length of the spreading code assigned to user $UE_i$, for $i=1, 2, 3, \ldots n$.

In addition, assignment of any spreading code blocks or restricts the use of any subordinate spreading code (e.g., longer spreading code beneath the assigned code) in the code tree (of FIG. 3, for example). This restriction is well-known in the art, and thus, a detailed discussion of this will be omitted for the sake of brevity.

As in the previous example, assume the spectrum bandwidth B for the cell-site of FIG. 1 is $8B_0$ and $N=3$. If user $UE_3$, belonging to spectrum bandwidth class $j=3$, is assigned a code 8 chips in length (e.g., '10101010'), the effective spectrum bandwidth assigned to user $UE_3$ is $B_0$ even though the data signal may be spread over the entire spectrum $8B_0$.

On the other hand if user $UE_3$ is assigned a code 2 chips in length (e.g., '10'), the effective spectrum bandwidth assigned to user $UE_3$ is $4B_0$, and all other codes under the 2 chip spreading code in the code tree may not be assigned to any other user scheduled for the same simultaneous transmission. For example, with regard to the code tree of FIG. 3, if user $UE_3$ is assigned the code '10', then none of spreading codes in the code tree under node '10' may be assigned to other scheduled users, for example, users $UE_1$ or $UE_2$, scheduled for the same simultaneous transmission. In this example embodiment, the CAM 204 may assign a single spreading code to each user, or multiple spreading codes to each user.

Referring back to FIG. 2, after the CAM 204 assigns spreading codes to each scheduled user (in either of the above mentioned example manners), the baseband signal generation module 206 may combine (e.g., add in binary space) the spread signals from scheduled users $UE_1$, $UE_2$ and $UE_3$ to generate a baseband signal (e.g., a forward link (FL) baseband signal) to be transmitted. The combining performed by the baseband signal generation module 206 may be done in any well-known manner, and as such, a detailed discussion has been omitted for the sake of brevity.

Concurrently, the spreading code assigned to each user $UE_1$, $UE_2$ and $UE_3$ may be conveyed to each user via a separate signaling channel. This conveyance may also be performed before the baseband signal is actually transmitted or delivered to the users, and may be done via any suitable signaling channel as is well-known in the art. Because these signaling channels are well-known, a detailed discussion has been omitted for the sake of brevity. The combined signal may be transmitted to the users $UE_1$, $UE_2$ and $UE_3$ by a transmitter (not shown) in any well-known manner.

Figure 4:
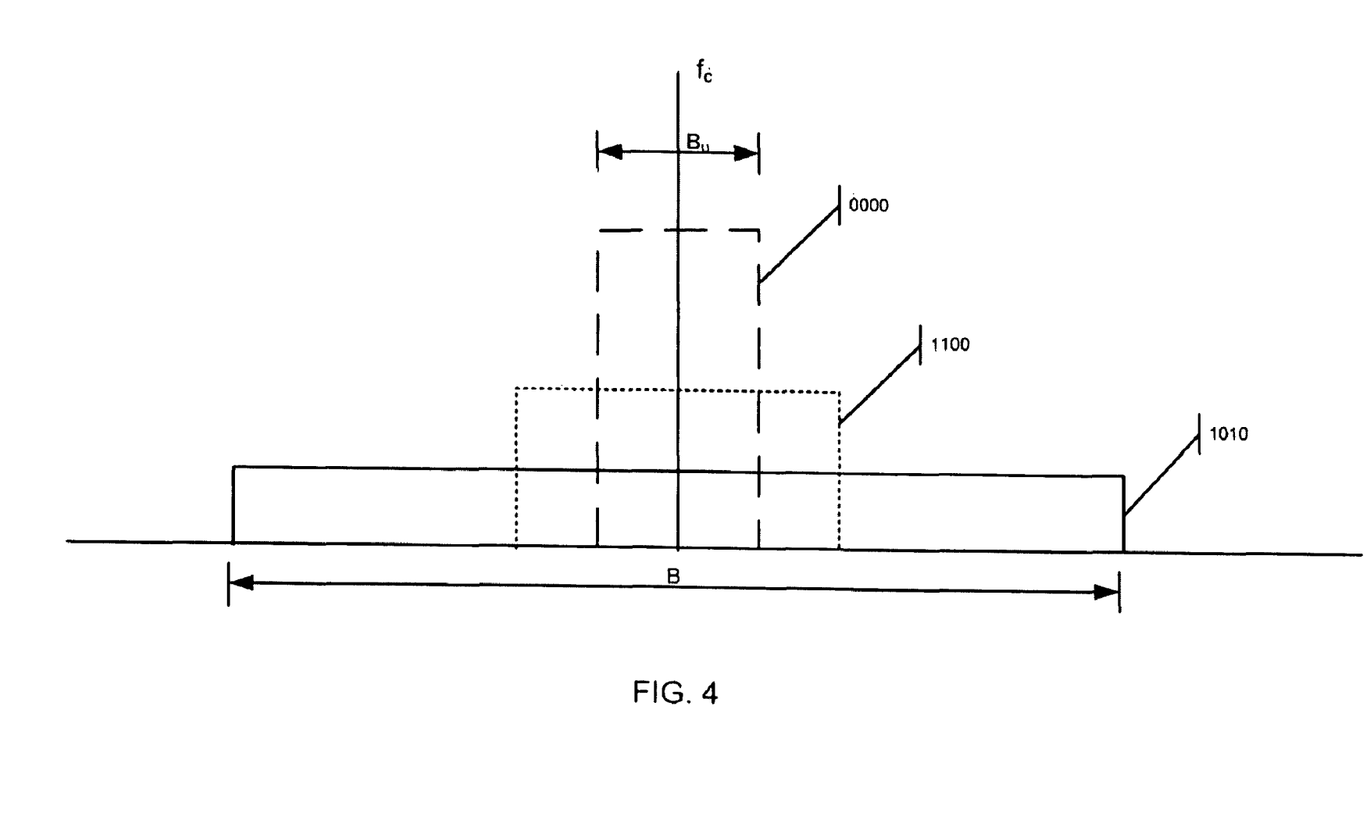
FIG. 4 illustrates an example correlation between assigned codes and spectrum for a wireless system.

FIG. 4 shows an example correlation between assigned codes and spectrum bandwidth over which a data signal is spread for a wireless system with $B=4B_0$. FIG. 4 will be discussed with regard to $UE_2$ for example purposes. As discussed above, user $UE_2$ may belong to spectrum bandwidth class $j=2$. That is, for example, in the case of FIG. 4, the user $UE_2$ supports the maximum spectrum bandwidth $B=4B_0$.

Referring to FIG. 4, if the code '1111' is assigned to user $UE_2$, the data signal is spread over single carrier spectrum bandwidth $B_0$. Alternatively, assigning code 1100 to user $UE_2$ may result in the same data signal spanning a spectrum bandwidth of $2B_0$. Furthermore, assigning code '1010' to user $UE_2$ may result in the same signal spanning the entire spectrum bandwidth $4B_0$. In each of the examples shown in FIG. 4; however, the user $UE_2$ achieves the same throughput or information data rate while the spectrum power may be decreased as the spectrum bandwidth increases.

Example embodiments of the present invention provide a more cost effective RF chain design by removing multiple single-carrier filters. Moreover, example embodiments of the present invention may improve forward link RF capacity, reduce the inter-carrier guard band and/or more efficiently utilize spectrum resources because the cross-carrier interference may be reduced for older, legacy users and/or eliminated for newer, enhanced users.

Although the foregoing description focuses on methods for transmitting wideband signals via a radio communication system adapted for transmitting narrow-band signals, persons of ordinary skill in the art will readily appreciate that the techniques of the present invention are in no way limited to radio communication systems, systems transmitting signals with only two distinct bandwidths, or to systems adapted for transmitting narrowband signals. On the contrary, any communication system which might benefit from shared access to a plurality of frequencies by two or more transceivers transmitting and/or receiving signals at two or more bandwidths may employ the techniques shown herein. Such systems might include systems employing methods for transmitting narrow-band signals via a radio communication system adapted for transmitting wideband signals. Further, wired systems such as computer networks could employ the techniques provided herein without departing from the scope of the invention.

Example embodiments of the present invention have been described with regard to spectrum bandwidth. However, it will be understood that in at least some instances, spectrum bandwidth may be synonymous with bandwidth, spectrum, data rate, etc.

The invention being thus described, it will be obvious that the same may be varied in many ways. Such variations are not to be regarded as a departure from the invention, and all such modifications are intended to be included within the scope of the invention.

We claim:

1. A method for allocating at least a portion of a total spectrum bandwidth for a multi-carrier wireless system to a plurality of users transmitting simultaneously, the method comprising:
    allocating at least a portion of the total spectrum bandwidth to each of a plurality of users by assigning at least one unique spreading code to each of the plurality of users, at least two of a plurality of users having different spectrum capabilities and transmitting simultaneously, each of the assigned spreading codes having a same code length, and a number of spreading codes assigned to each user being indicative of a portion of the total spectrum bandwidth allocated to each user,
    wherein each of the plurality of users is associated with a spectrum bandwidth class based on a spectrum capability associated with each user, the spectrum capability of a respective user being a number of supported carriers associated with a maximum supported bandwidth of the respective user.

2. The method of claim 1, wherein the code length is based on the spectrum bandwidth class of the user having a highest spectrum capability.

3. The method of claim 2, wherein the spectrum bandwidth class associated with each user is indicative of a spectrum over which each user receives transmitted signals.

4. The method of claim 1, wherein the number of spreading codes assigned to each user depends on at least a target throughput associated with each user.

5. The method of claim 1, wherein as the number of spreading codes assigned to each user increases, the portion of the total spectrum bandwidth assigned to each user increases.

6. The method of claim 1, wherein at least two of the plurality of users are assigned a different number of spreading codes based on a target throughput associated with each of the plurality of users.

7. The method of claim 1, further comprising:
    determining a number of spreading codes to assign to each of the plurality of users based on at least a target throughput associated with each user; and wherein
    the total spectrum bandwidth is allocated by assigning spreading codes based on the determining step.

8. The method of claim 7, wherein the assigned spreading codes are selected from a code tree or Hadamard matrix based on the determining step.

9. The method of claim 1, further comprising:
    comparing target throughputs associated with each user; and wherein
    at least two spreading codes are assigned to at least a user having a largest associated target throughput.

10. The method of claim 1, wherein a code pattern of each code assigned to each of the plurality of users depends on the spectrum bandwidth capability of each user.

11. The method of claim 1, wherein a spectrum bandwidth class of each of the plurality of users is indicative of decoding capabilities of each user.

12. The method of claim 1, wherein a code pattern of the at least one unique spreading code assigned to each of the plurality of users depends on a spectrum bandwidth class of each user.

13. A method for allocating at least a portion of a total spectrum bandwidth for a multi-carrier wireless system to a plurality of users transmitting simultaneously, the method comprising:
    allocating at least a portion of the total spectrum bandwidth to each of a plurality of users by assigning at least one unique spreading code to each of the plurality of users, at least two of the plurality of users having different spectrum capabilities and transmitting simultaneously, at least two of the assigned spreading codes having different code lengths, and the code length of a spreading code assigned to a user being indicative of the total spectrum bandwidth allocated to the user,
    wherein each of the plurality of users is associated with a spectrum bandwidth class based on a spectrum capability associated with each user, the spectrum capability of a respective user being a number of supported carriers associated with a maximum supported bandwidth of the respective user.

14. The method of claim 13, wherein the length of each spreading code is based on the spectrum bandwidth class of the user to which the spreading code is assigned.

15. The method of claim 14, wherein the spectrum bandwidth class associated with each user is indicative of a spectrum over which each user receives transmitted signals.

16. The method of claim 13, wherein the code length is inversely proportional to the portion of the total spectrum bandwidth assigned to each of the plurality of users.

17. The method of claim 13, wherein at least two of the plurality of users are assigned spreading codes having different code lengths based on at least a target throughput associated with each of the plurality of users.

18. The method of claim 13, further comprising:
    determining at least one of a code length of a spreading code and a number of spreading codes to assign to each of the plurality of users based on a target throughput associated with each user; wherein
    the total spectrum bandwidth is allocated by assigning spreading codes based on the determining step.

19. The method of claim 18, wherein the assigned spreading codes are selected from a code tree or Hadamard matrix based on the determining step.

* * * * *